Figure 1:
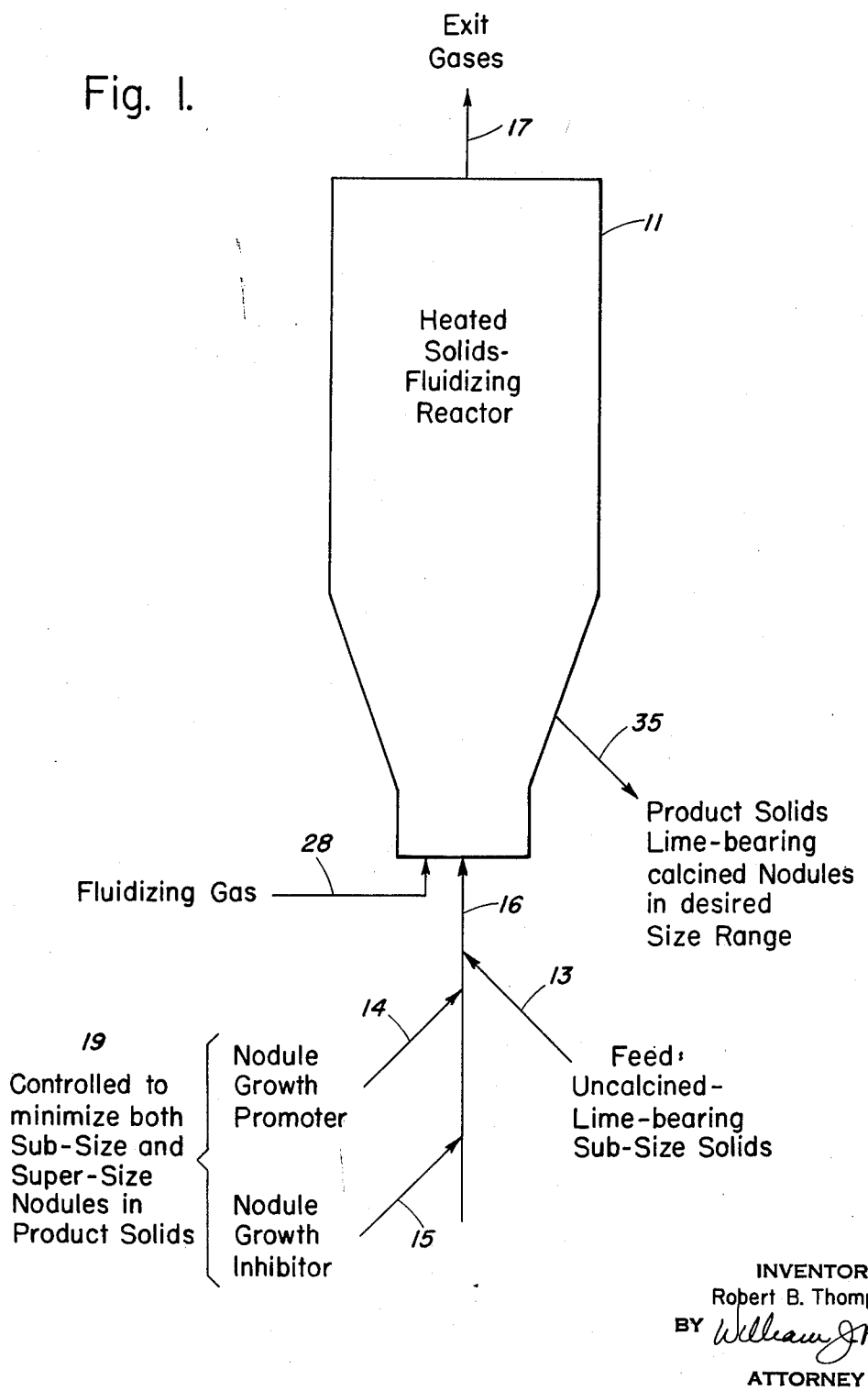

March 13, 1956 R. B. THOMPSON 2,738,182
METHOD OF CALCINING LIME BEARING SLUDGES
Filed July 25, 1951 3 Sheets—Sheet 3

INVENTOR
Robert B. Thompson
BY William Fox
ATTORNEY

United States Patent Office 2,738,182
Patented Mar. 13, 1956

2,738,182

METHOD OF CALCINING LIME BEARING SLUDGES

Robert B. Thompson, Wilton, Conn., assignor to Dorr-Oliver Incorporated, a corporation of Delaware Application July 25, 1951, Serial No. 238,553

1 Claim. (Cl. 263—53)

This invention relates to the calcination and nodulization of lime-bearing solids such as those contained in trade sludges or slurries and in water-softening sludge and the like.

The lime-bearing solids of such trade or water-softening sludges are in the form of ultra-fine solids. Such solids, when dried, become a dust-like powder, are extremely difficult to handle and constitute a definite dust nuisance in populated areas. However, the lime content of such solids is of considerable value and there is a great demand for its recovery as calcined lime for further use as a reactant. The dust-like nature of these solids makes calcination thereof by ordinary means an extremely dusty operation and one which is not particularly efficient due to high dust losses. However, these objections may be overcome by transforming these ultra-fine uncalcined lime-bearing solids into relatively larger nodules or pellets of calcined lime-bearing solids thus eliminating dust losses as well as dust nuisance while yielding a valuable calcined lime-bearing reactant that is much easier to handle.

Heretofore such solids, along with a nodule growth promoter to insure nodulization, have been calcined and nodulized in conventional fluidized solids reactors under solids fluidizing conditions. A suitable nodule growth promoter is an adhesive that melts below the decomposition temperature of the solids being nodulized, but does not become thermo-setting at such decomposition temperature.

In their present state, however, such prior fluidizing methods are only partially successful for the continuous nodulizing of fine solids because of the continued increase in the size of nodules formed within the reactors. This uncontrolled nodule growth results in super-size nodules that are so large as to cause the solids to defluidize and operation of the process to cease.

So it is an object of this invention to provide ways and means whereby such lime-bearing solids can be calcined and nodulized under solids-fluidizing conditions while the particle size of the nodules thus formed is controlled to lie below a desired maximum, or their growth inhibited after a certain size is reached so that nodules may be formed under continuous solids-fluidizing conditions without danger of defluidization of the solids due to the formation of super-size nodules.

By the words nodules, pellets or pellicules as used in this specification is meant substantially spherical solid particles composed of a series of concentric shells or layers of solids surrounding a core or nucleus. That is, nodule growth is caused by the successive accretion of a number of such concentric shells around a starting core. It is characteristic of these nodules that they do not agglomerate or stick to each other, but they do present a surface for fine non-nodulized solids to adhere to. By the term growth, is meant a gradual increase in size of inorganic materials such as by accretion.

I have discovered that control of the maximum size of calcined nodules formed by fluidized solids processes can be attained by comminuting a portion of similarly formed calcined nodules by grinding, pulverizing or other comminuting means, and adding such comminuted solids to the fluidized solids already in the reactor. These added comminuted solids act as a growth inhibitor within the reactor and prevent the nodules being formed therein from growing to such an undesired large size that solids fluidizing conditions are interfered with or halted. Therefore, this invention permits the controlling of nodule growth within such reactors so that calcined nodules formed therein will not be below a desired minimum yet will be below that size which would cause defluidization thereof.

Broadly but briefly stated, this invention contemplates heat treating of finely-divided uncalcined lime-bearing materials under solids fluidizing conditions to produce calcined lime-bearing nodules of a size controlled to lie above a desired minimum yet below an undesirable maximum. The minimum desired size is attained by insuring the presence of a sufficient quantity of adhesive in the reactor to promote at least the desired minimum nodule growth during the time solids are retained in the reactor for treatment. Control over maximum nodule size is attained by comminuting a quantity of similarly formed calcined nodules and adding such comminuted materials to the fluidized bed wherein uncalcined material is being treated to act therein as a size controlling growth inhibitor.

More specifically, this invention proposes to calcine and nodulize finely-divided lime-bearing solids in an enclosed chamber maintained at calcining temperatures by maintaining therein a bed of such solids in the presence of an adhesive substance, maintaining the solids of such bed fluidized as a dense turbulent suspension in an uprising gas stream whereby calcined nodules of a size at least as large as the desired minimum size are formed, removing calcined nodules from the bed, and controlling the size of nodules formed in the bed by supplying thereto a regulated quantity of previously comminuted similarly formed nodules to act as a size controlling growth inhibitor therein.

Before presenting a detailed description of the invention hereof it will be advisable to discuss briefly the nature of the fluidized solids technique as referred to herein.

A fluidized solids reactor or furnace in its simplest form is a vertical vessel having a perforated horizontal partition in its lower portion. Finely-divided solids are supplied to the vessel to form a bed of such solids on the perforated partition. Gas is passed upwardly from the bottom of the vessel through the perforated partition and through the powdered finely-divided solids at such a velocity or rate that the solids are kept mobilized so as to be mixed and unstratified as a bed or layer in the vessel of gas-suspended solids. The mobilized solids are in dense turbulent suspension and are usually referred to as a fluidized bed.

A fluidized bed is therefore a very dense suspension of mobilized fine solids suspended in an upflowing stream of gas. The density or solids concentration per unit volume of such a fluidized bed is very high, being commonly on the order of 10 to 100 pounds of solids per cubic foot of bed volume. This bed density is to be contrasted with typical dilute dispersions or suspensions, such as dusty air wherein the density of solids concentration is of the order of only $\frac{1}{50}$ of a pound per cubic foot of the dispersion. In addition, the solid particles of a fluidized bed are in a state of turbulence or erratic zig-zag motion in the bed even when the suspending gas has a relatively low velocity; such high turbulence causes intimate and rapid mixing of the solid particles so that in a typical bed complete mixing of the solids appears to take place instantaneously. A fluidized bed, because of its high density and great turbulence, is noted for the rapid transfer of heat between its solid and gaseous components; this heat transfer is so rapid that a remarkable uniformity or homogeneity in the temperature of the bed results. This dense suspension behaves like a turbulent liquid and exhibits a fluid level so that it will flow hydrostatically just as a fluid does.

Processes are in use whereby such fluidized solids techniques are employed to produce calcined nodulized solids from finely-divided lime-bearing materials. In such processes nodulization of the solids is attained by assuring the presence, in the reactor, of a quantity of adhesive substance such as soda ash in an amount suitable to effect the desired nodulization. The concentration of this adhesive must be so adjusted that it will be sufficient at calcining temperatures to cause the finely-divided solids to form nodules but insufficient to cause the nodules to agglomerate or adhere to each other. When using soda ash as adhesive substance, a condition favorable to nodulization is attained by providing the material to be treated with a soda ash content of ½ to 2%. In some instances the materials to be treated already contain soda ash or a suitable substitute. In some cases it is necessary to adjust the concentration of adhesive to fall within prescribed limits.

However, it has been found that such processes while successful in producing calcined nodules have certain inherent disadvantages. Chief among these is the fact that the nodules continually increase in size which makes for improper solids fluidizing conditions causing "slugging" whereby the entire bed of solids moves unpredictably up and down within the reactor thus destroying the uniform turbulent fluid motion of the solids of the bed and causing the bed to defluidize and become inoperative. According to this invention, however, by introducing into the fluidized bed a quantity of comminuted calcined material the size of nodules formed therein is controlled to be below a predetermined maximum so that such nodules will not become so large as to cause slugging and eventual defluidization of the bed.

It is necessary to determine the quantity and size-consist of the comminuted calcined material which must be added to the calcining bed so that the desired nodule size may be maintained therein. Generally speaking, such added material is smaller than the desired maximum nodule size and greater than the ultra-fine uncalcined material being introduced into the bed. I have found that when this added material is relatively coarse more of it must be added, whereas when it is relatively fine less of it is required to obtain control of nodule size. Factors of control thus reside in varying the size-consist and/or quantity of the comminuted calcined material being added to the bed.

In order to determine the quantity and size-consist of added material the reactor is started up and periodic size analyses are made of the calcined product being discharged from the reactor. If nodule size is found to be too large or is increasing too rapidly then this condition is corrected, in accordance with this invention, either by adding more comminuted material to the bed or by having the material more finely comminuted before addition to the bed. By the same token, if larger nodules are desired less comminuted material is added or a relatively less finely comminuted material is added. When nodule size equilibrium has thus been reached the process will operate continuously under proper solids fluidizing conditions.

The best embodiment of the invention now known to me has been selected for the purpose of illustration but it is to be understood that it is illustrative only and not limited for obviously changes in arrangement, construction and detail can be made without departing from the scope of the invention as defined by the appended claim bearing in mind, however, that their requirements include equivalents thereof.

Figure 2:
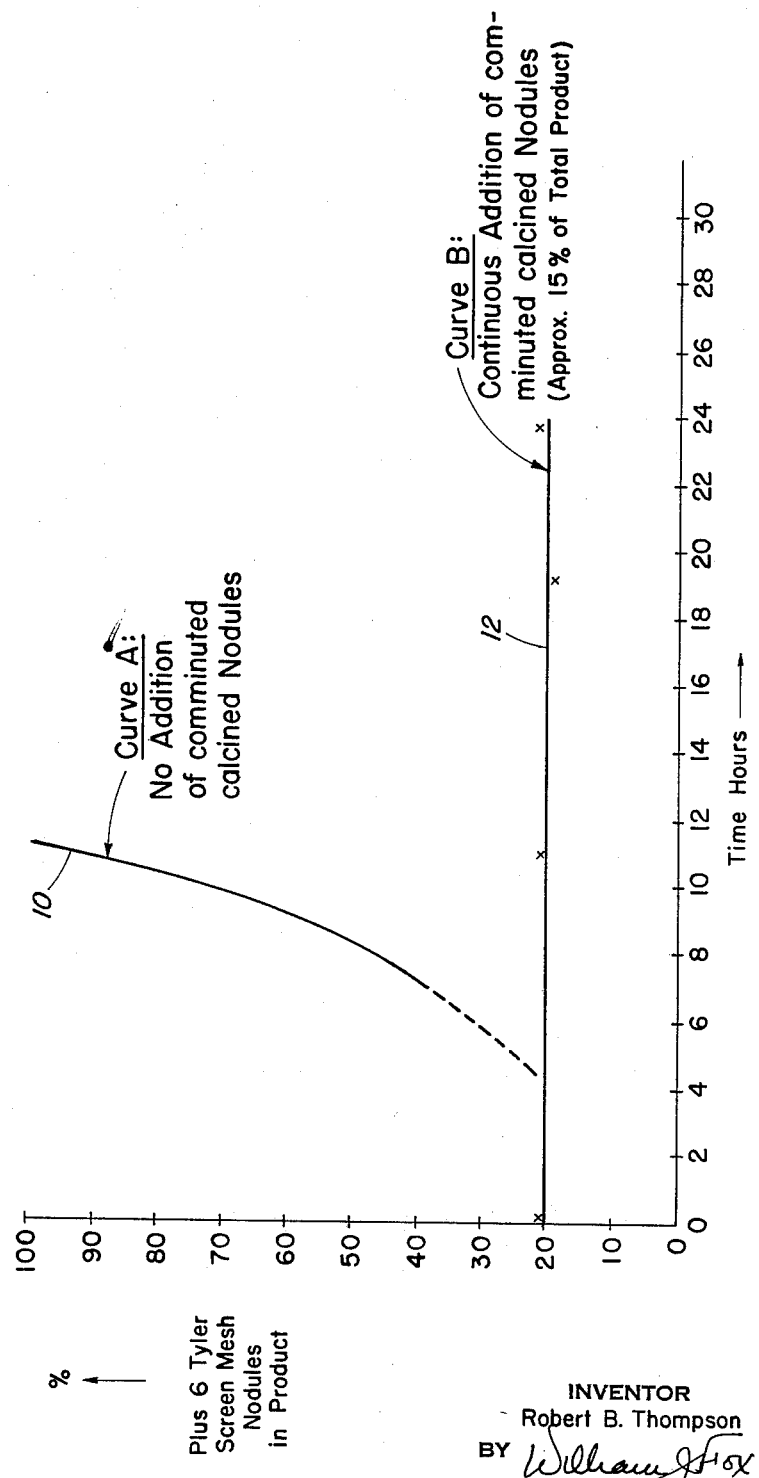
Figure 3:
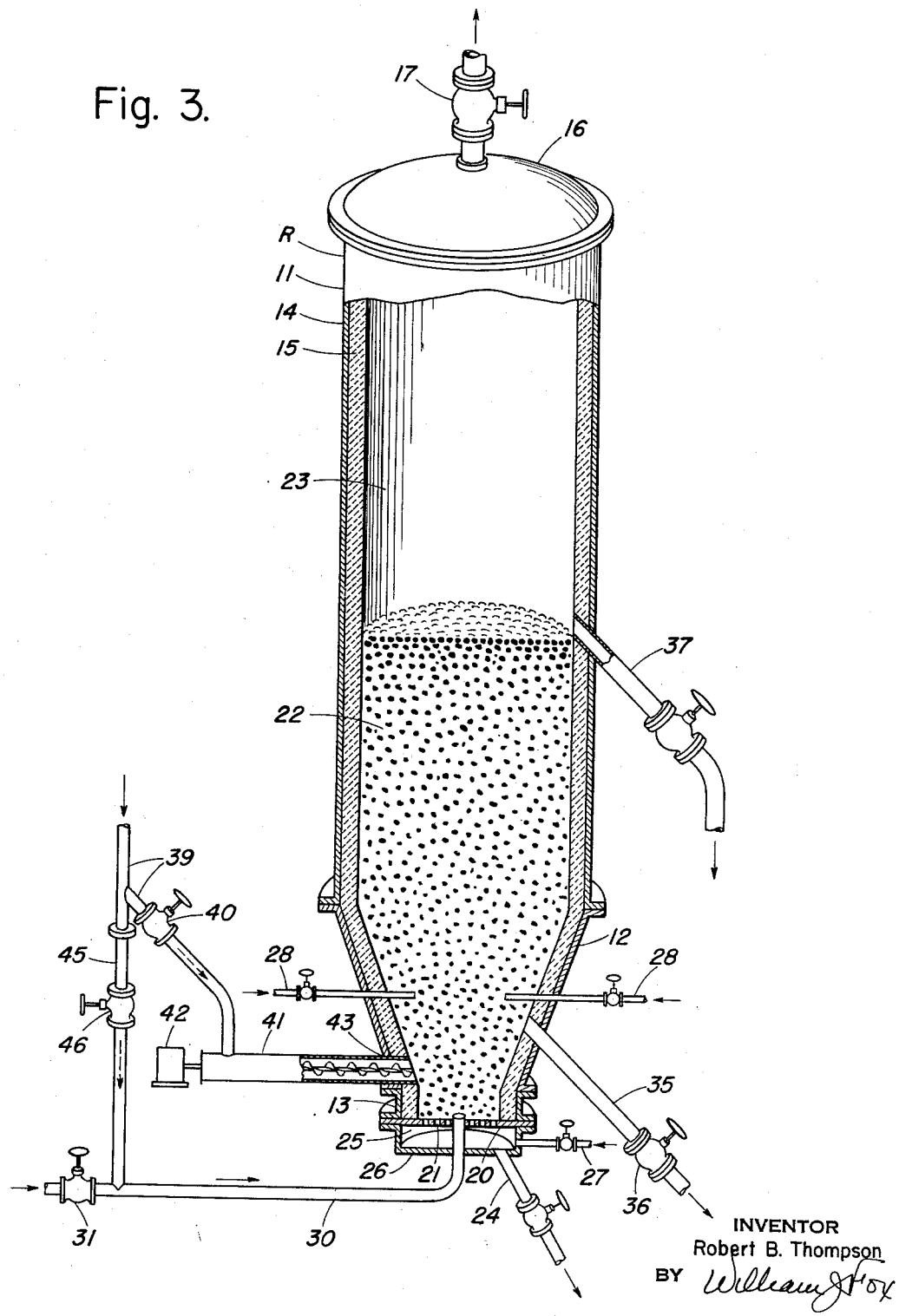

In the drawings, Figure 1 is a flowsheet type of diagram depicting the essential elements of this invention in their cooperative relationship to each other. Figure 2 is a graph depicting the effect of the addition of comminuted calcined materials on the size of nodules formed in a continuously operating fluidized bed as contrasted with the size of nodules formed in a similar bed without the addition of such comminuted materials. Figure 3 is a cutaway perspective view showing a preferred embodiment of this invention.

In Figure 1 there is shown symbolically a solids fluidizing reactor 11. Fluidizing gas is supplied to the reactor 11 as shown by 28 while gases exit from the reactor top as indicated by 17. Uncalcined feed as shown at 13 as well as nodule growth promotor 14, and nodule growth inhibitor 15 are supplied to the reactor. As indicated by legend 19, the quantities of nodule growth promoter and nodule growth inhibitor supplied to the reactor are controlled to minimize both sub-size and super-size nodules in the product solids.

Sub-size nodules are minimized by the presence of sufficient nodule growth promoter to insure nodulization at least to the desired minimum size range. Super-size nodules are minimized by the addition of sufficient comminuted similarly formed calcined nodules to inhibit the growth of nodules beyond a desired maximum size.

Figure 2 is a comparative graph of the percent of +6 Tyler screen mesh nodules in the product plotted against the hours of continuous operation of the reactor. Curve A (reference numeral 10) shows the uncontrolled growth in nodule size within the fluidized bed when the addition of size controlling comminuted solids is not employed. By contrast curve B also designated by reference numeral 12 represents product size in a continuous operation, according to this invention, wherein comminuted similarly calcined material has been continuously added to the bed. This curve shows the stabilizing and controlling effect that this invention has on the size of nodules formed within a fluidized bed thereby demonstrating how this invention makes continuous operation possible.

In Figure 3 the total assembly called a reactor R is preferably a vertical cylinder 11 with a lower coned section 12 to the bottom of which is attached a cylindrical section 13. All sections of the reactor have a metal outer wall 14 and are lined with refractory or firebrick 15. The reactor has a top 16 which is equipped with a valved exit-gas outlet 17. Located in the bottom of cylindrical section 13 is a gas permeable construction plate 20 having apertures such as at 21 and adapted to hold thereon a bed 22 of finely-divided solids being treated, above which is freeboard space 23. Below constriction plate 20 and attached thereto is a plenum space 25 defined by walls 26. Plenum space 25 serves as a windbox for delivering fluidizing air through constriction plate 20 to fluidize the solids and bed 22. Plenum space 25 is equipped with a suitably valved clean-out conduit 24.

Fluidizing air is introduced into plenum space 25 via valved conduit 27. Fuel for starting up can be supplied by external torches, but these are omitted from the drawings to avoid unnecessarily complicating them. An initial bed of nodulized solids for starting up can be introduced into the reactor via conduit 39 and feeder 41 by by any suitable feeding means. When the reactor is in continuous operation fuel is supplied through valved conduits 28 and is combusted within the bed. Finely-divided feed material entrained in air is supplied to the bed through conduit 30 which is valved as at 31. Conduit 30 passes upwardly through plenum space 25 and constriction plate 20 and leads directly to the reactor.

The adhesive material and feed are introduced into the reactor via conduit 30. Solids are nodulized in the lower part of the reactor, that is nodulization occurs generally within coned section 12. Calcined nodules are withdrawn from the bed via conduit 35 which is valved as at 36. Valved overflow conduit 37 is provided to maintain the upper level of bed 22 substantially constant.

Comminuted solids to be used for controlling the rate of nodule growth in the bed are introduced to the reactor via conduit 39 which is valved as at 40. These solids are fed into feeding mechanism 41 driven by motor 42 and are introduced into the bed at point 43. Alternatively the comminuted solids may by-pass feeder 41 via conduit 45 valved as at 46 to be introduced into feed supply conduit 30 thence to be carried into bed 22 along with the feed and adhesive material.

When the reactor is in full and continuous operation, fuel is supplied through conduits 28 and oxygen-bearing fluidizing gas is supplied through conduit 27 to windbox 25 thence to bed 22 to fluidize the solids therein as well as to support the combustion of fuel. Finely-divided solids to be treated are introduced into bed 22 via conduit 30. Fluidizing gas entering from the windbox through the apertures of constriction plate 20 picks up the fine solids in the lower section of the bed and carries them dispersingly upwardly through the bed. The feed solids either agglomerate together to form small cores for nodule growth thereon or they adhere to the outer surfaces of already formed nodules causing them to grow even larger.

Nodule growth occurs, generally speaking, in the lower section of the bed and particularly in the lower-central section of the bed in the area of extreme turbulence directly above constriction plate 20 where the velocity of the entering fluidizing gas is relatively high. Fine solids entering the bed are violently agitated and impinge against already formed nodules thus causing nodule growth by accretion. This violent localized turbulent motion of the bed solids is not typical of fluidized beds in general but is characteristic in cone-shaped reactors where the entering fluidizing gas has a relatively high velocity.

Calcined nodules are discharged from the bed via conduit 36 and are sent to cooling chambers or to other processes except that a portion of such products may be comminuted and returned to the bed via conduit 39. Exit gases leave the reactor via conduit 17.

The fluidizing gas entering the reactor has a relatively high initial velocity during passage through cylindrical section 13. However, the dispersion of the gas rising through the reactor decreases its velocity so that upon exiting from the bed it has a relatively low velocity. The result is a lower violently turbulent area above which is a denser mass of less violently turbulent solids.

*Example*

In an actual experimental operation a reactor of the design shown in Figure 3 was used to calcine and nodulize the lime-bearing materials contained in water softening sludge.

A reactor was employed in which the largest inside diameter was two feet six inches, the diameter of the perforated partition at the bottom of the reactor was 13 inches and the volume of material contained within this reactor was substantially seven feet in depth with a freeboard space above this bed of approximately 10 feet.

The sludge containing the material to be treated was first dried by conventional means so that as it was ready to enter the reactor it was a dry powdery solid. In the case described the lime bearing material did not contain any adhesive substance so it was necessary to add a sufficient quantity of such substance in order to insure nodulization. Ordinary soda ash was used as an adhesive in a quantity sufficient to make the adhesive content equal to ½% to 2% of the total solids fed to the reactor. This addition was made before the materials were introduced into the reactor. However it is immaterial where the addition is made so long as it is made at such a point that it has an opportunity to promote the growth of nodules within the fluidized bed.

A bed of calcined nodules or other suitable material is introduced into the reactor before starting up in order to insure operating conditions within the reactor. The reactor was then heated to calcining and nodulizing temperatures (1600°–1800° F.) by the means of first using external heat sources to raise the temperature to fuel combustion temperatures, after which the external heat was removed and the heating continued by supplying fuel directly to the fluidized bed and combusting it there in the presence of oxygen in the upflowing fluidizing gas.

A fine feed admixed with adhesive substance is introduced into the reactor bottom and is picked up by the oxygen-bearing fluidizing gas entering the reactor. The oxygen-bearing fluidizing gas is supplied at such a rate that if no solids were present in the reactor the gas would pass through the lower cylindrical section at a linear velocity of approximately 30–40 feet per second. This velocity is referred to as space rate. As the gas passes upwardly through the coned section the volume which it occupies increases so that when the gas reaches the top of the bed it has a space rate of substantially 3.5 to 5.5 feet per second. As the gas passes upwardly through the bed it fluidizes the solids therein as previously described imparting to them a positive directional motion so that solids in the lower central portion of the bed move upwardly through the bed to the top thereof. In the upper portion of the bed the reduced gas velocity allows the still suspended solids to sink more or less gradually downwardly towards the bottom of the reactor.

The incoming fine feed is carried upwardly through the center of the bed and substantially all of this feed is nodulized during this upward movement through the area of extreme turbulence. New feed is introduced at such a rate that approximately 500 pounds per hour of product are discharged from the reactor. Approximately 15% of this product is sent to a grinding mill for comminution and this comminuted portion is returned to the reactor to be dispersed in the high velocity gas stream uprising through the center portion of the bed to act therein as a nodule growth inhibitor.

Exit gases are allowed to escape through the top of the reactor but are usually circulated through one or more separators in order to remove entrained solids. These separated solids may then be sent to the feed supply or returned directly to the reactor. Fuel consumption for the nodulizing process was substantially 56 gallons of oil per ton of product.

During continuous operation the size of the nodules formed in the fluidized bed was maintained at a constant level such as shown by curve B of Figure 2 so that substantially 90% of the nodules in the product would pass through a 6 mesh Tyler screen but be retained on a 150 mesh screen. Due to this constant size range of the solids no difficulty was encountered in maintaining them in a fluidized state.

Whereas I have described a simple operation wherein a single bed of fluidized solids is contained in a fluidized solids reactor nevertheless this invention will work equally well in any reactor wherein a plurality of such beds is employed such as the case where a reactor contains three superposed beds in which the upper bed is a preheating bed, the intermediate bed a calcining and nodulizing bed, and the lower bed a product cooling and fluidizing gas preheating bed.

It should also be noted that the comminuted material added to the fluidized bed to act as a growth inhibitor therein need not be produced within the same reactor to which it is added. It may come from a stockpile of such material maintained to serve several reactors or it may conceivably be imported for such use. However, this invention extends to all such cases.

I claim:

In the process for continuously heat treating finely-divided lime-bearing sludge solids to form calcined nodulized solids therefrom, which process comprises establishing and maintaining a bed of finely-divided solids in an enclosed chamber at calcining temperatures, maintaining solids of the bed as a dense homogeneous suspension behaving like a boiling liquid by passing dispersingly therethrough an uprising stream of gas at solids-fluidizing velocities, continuously feeding finely-divided solids to the bed and there calcining them, continuously supplying an adhesive substance to the bed to promote the growth of nodules from the fine feed undergoing calcination, and discharging calcined nodules from the bed; the improvement which comprises controlling the maximum size of nodules formed within the bed by comminuting a quantity of similarly formed nodules to a size larger than the incoming feed but smaller than the unground product nodules, and continuously adding a regulated quantity of such comminuted solids to the bed.

References Cited in the file of this patent
UNITED STATES PATENTS

| | | |
|---|---|---|
| 2,052,329 | Wendeborn | Aug. 25, 1936 |
| 2,090,868 | Hyde | Aug. 24, 1937 |
| 2,125,263 | Ahlmann | Aug. 2, 1938 |
| 2,214,345 | Pike | Sept. 10, 1940 |
| 2,465,410 | White | Mar. 29, 1949 |
| 2,498,710 | Roetheli | Feb. 28, 1950 |